United States Patent [19]

Makus

[11] Patent Number: 4,925,882

[45] Date of Patent: May 15, 1990

[54] AQUEOUS MOLD RELEASE AGENT FOR THE PRODUCTON OF MOLDED POLYURETHANE ARTICLES

[75] Inventor: Zdzislaw Makus, Bad Wiessee, Fed. Rep. of Germany

[73] Assignee: Codal-Chemie GmbH, Fed. Rep. of Germany

[21] Appl. No.: 283,837

[22] Filed: Dec. 13, 1988

[30] Foreign Application Priority Data

Dec. 14, 1987 [DE] Fed. Rep. of Germany ....... 3742370
Dec. 14, 1987 [DE] Fed. Rep. of Germany ....... 3742368

[51] Int. Cl.$^5$ .............................................. C08G 18/14
[52] U.S. Cl. .................................. 521/132; 106/38.22; 106/285; 524/839; 524/836; 524/871; 525/131
[58] Field of Search .................... 521/132; 106/38.22, 106/285; 524/836, 839, 871; 525/131

[56] References Cited

U.S. PATENT DOCUMENTS 4,336,173 6/1982 Ugelstad ............................ 524/836

*Primary Examiner*—Maurice J. Welsh
*Attorney, Agent, or Firm*—Larson and Taylor

[57] ABSTRACT

An aqueous mold release agent for the production of molded polyurethane articles, especially polyurethane soft foam articles, is provided which contains as substance effecting mold release at least a portion of one or more unsaturated oligomeric or polymeric hydrocarbons having molecular weights of at least 500 and iodine values of at least 60, preferably in combination with one or more foam stabilizers suited for polyurethane systems.

11 Claims, No Drawings

AQUEOUS MOLD RELEASE AGENT FOR THE PRODUCTON OF MOLDED POLYURETHANE ARTICLES

It has been known that polyurethanes exhibit a high degree of adhesion toward other materials, and this has resulted in widespread use of polyurethane systems in the area of adhesives. However, in the manufacture of molded polyurethane articles-no matter whether or not they are foamed-this adhesive quality proves to be very disadvantageous. Therefore, it is necessary in the manufacture of such molded articles to use mold release agents which are applied onto the walls of the mold that get into contact with the polyurethane systems. In most instances mold release agents on the basis of wax, soaps and/or oil are sprayed into the opened mold my means of pressurized air (airless guns); it is the uniform application and not so much the quantity of release agent that is significant. Spraying must be repeated after each mold release.

In contrast to the former practice of working exclusively with solvent-containing mold release agents, attents are being made nowadays to employ release agents on an aqueous basis for reasons of environment protection, for example agents containing higher molecular weight hydrocarbons as mold release component. Examples for these substances are aqueous dispersions of polyethylene waxes or aqueous emulsions of paraffins; said waxes are selected by the expert to meet the requirements of each individual case.

In general, however, it has proved disadvantageous with the use of said aqueous release agents, especially when used in the production of soft polyurethane foams, that the surfaces of the released molded parts still had exessively large pores. Moreover, with the use of said aqueous release agents it is indispensable to newly spray the mold walls after each mold release. If this is not done, the surface of the molded articles will be damaged when taken out of the mold to such an extent that the molded article is no longer acceptable and must be rejected. This applies also and particularly to soft polyurethane foams.

Therefore it is the object of the present invention to provide an aqueous release agent for the manufacture of molded polyurethane articles, especially of molded polyurethane soft foam articles, which, on the one hand, improves the qualities of the surface of the molded polyurethane articles and which, on the other hand, effect better mold release which is still sufficiently active even when occasionally the operator forgets to spray the mold walls anew after mold release, so that in such a case a molded article is nevertheless obtained which has an undamaged surface after mold release.

According to the present invention, this object is realized by an aqueous mold release agent containing as effective release substance at least a portion of one or more unsaturated oligomeric or polymeric hydrocarbons and, preferably in combination with said agents, one or more foam stabilizers suited for use with polyurethane systems. Said unsaturated oligomeric or polymeric hydrocarbons have a molecular weight of at least 500, preferably from 1000 to 10 000, especially from 2500 to 6000, and iodine values of at least 60, preferably from 150 to 600.

The unsaturated hydrocarbons employed according to the invention may be either homopolymers or copolymers or block copolymers. They may be solid, swellable, liquid or flowable. Preferably they are liquid or flowable at room temperature at least under the processing conditions. Preferably they do not contain the double bonds in conjugated form, so that the unsaturated hydrocarbons especially preferred for the purposes of the invention include compounds which are oligomers or polymers of isoprene and/or butadiene, and which optionally are copolymerized or block copolymerized with further monomers polymerizable therewith. Moreover, they may also contain functional groups, especially groups containing oxygen and/or nitrogen, and groups containing active hydrogen atoms according to Zerewitinoff.

An unsaturated hydrocarbon the use of which is especially preferred according to the invention is a liquid polybutadiene having a molecular weight of about 3000 and an iodine value of about 450.

The mold release agent of the invention contains the unsaturated hydrocarbons preferably in an amount of 0,5 to 50% by weight, especially in an amount of 1 to 40% by weight, based on the total weight of the release agent. The amounts of unsaturated hydrocarbons best suited for the particular polyurethane system employed are determined experimentally in the manner familiar to the expert, therefore they may be also 3 to 50% by weight or 5 to 40% by weight.

As emulsifiers the conventional emulsifiers are used in the customary quantities.

As foam stabilizers the stabilizers conventional for the selected polyurethane foam systems are employed. The foam stabilizers preferably employed according to the invention include polysiloxane/polyether copolymers of various structeres as described, for example, in the plastics handbook "Polyurethane" by Becker/-Braun, Hanser-Verlag, München, and in the U.S. Pat. Nos. 2 834 748, 2 917 480, 3 629 308 and in DE OS 25 58 523.

The aqueous mold release agents of the invention may further contain additives customary in mold release agents, such as biocides, amine compunds, quaternary ammonium compounds, surface-modifying substances (bentonites) etc.

The following examples explain the invention without restricting it in any way.

EXAMPLE 1

An aqueous mold release agent used in the manufacture of polyurethane soft foam molded articles has the following composition:

20% by weight of liquid butadiene (molecular weight about 3000; iodine value about 450)

4% by weight of ethoxylated fatty alcohol 8-EO (emulsifier)

76% by weight of water

EXAMPLE 2

A further aqueous mold release agent used in the production of polyurethane hard foam molded articles has the following composition:

10% by weight of liquid butadiene (molecular weight about 3000; iodine value: about 450)

10% by weight of microwax (f.p. 70° C.)

4% by weight of emulsifier: Mulsifam RT 231 =combination of alkylaryl and alkylpolyglycol ethers (commercial product of Messrs. Zschimmer & Schwarz)

76% by weight of water

EXAMPLE 3

An aqueous mold release agent used in the production of polyurethane soft foam molded articles has the following composition:

20% by weight of liquid butadiene (molecular weight about 3000; iodine value about 450)

4% by weight of ethoxylated fatty alcohol 8-EO (emulsifier)

2% by weight of foam stabilizer DC-190 (commercial product of Messrs. Dow Corning)

74% by weight of water

EXAMPLE 4

A further aqueous mold release agent used in the manufacture of polyurethane hard foam molded articles has the following composition:

10% by weight of liquid butadiene (molecular weight about 3000; iodine value 450)

10% by weight of microwax (f.p. 70° C.)

4% by weight of emulsifier: Mulsifam RT 231 = combination of alkylaryl ethers and alkylpolyglycol ethers (commercial product of Messrs. Zschimmer & Schwarz)

2% by weight of foam stabilizer DC-190 (commercial product of Mesrs. Dow Corning)

74% by weight of water

I claim:

1. An aqueous mold release agent for the production of molded polyurethane articles, especially molded soft foam articles, consisting essentially of water, substances effecting mold release, and emulsifiers, characterized in that as substance effecting mold release it contains at least a portion of one or more unsaturated oligomeric or polymeric hydrocarbons having molecular weights of at least 500 and iodine numbers of at least 60.

2. Aqueous mold release agent according to claim 1, characterized in that in combination with the oligomeric or polymeric hydrocarbon or hydrocarbons it contains one or more foam stabilizers suitable for polyurethane systems.

3. Aqueous mold release agent according to claim 1, characterized in that the unsaturated hydrocarbons have a molecular weight of 1000 to 10 000.

4. Aqueous mold release agent according to claim 1, characterized in that the unsaturated hydrocarbons have an iodine value of 150 to 600.

5. Aqueous mold release agent according to claim 1, characterized in that the unsaturated hydrocarbons are liquid or flowable at room temperature or under the processing conditions.

6. Aqueous mold release agent according to claim 1, characterized in that the unsaturated hydrocarbons are homopolymers or copolymers or block copolymers, respectively.

7. Aqueous mold release agent according to claim 1, characterized in that the unsaturated hydrocarbons additionally contain functional groups, especially groups containing oxygen and/or nitrogen, and groups containing active hydrogen atoms according to Zerewitinoff.

8. Aqueous mold release agent according to claim 1, characterized in that the unsaturated hydrocarbons are oligomers or polymers of isoprene and/or butadiene which may optionally be copolymerized or block copolymerized with other monomers polymerizable or block copolymerizable therewith.

9. Aqueous mold release agent according to claim 1, characterized in that it contains the unsaturated hydrocarbons in an amount from 0,5 to 50% by weight, especially in an amount of 1 to 40% by weight, based on the total weight of mold release agent.

10. An aqueous mold release agent according to claim 1, characterized in that it contains the foam stabilizers in an amount of 0.2 to 6% by weight, preferably 0.5 to 3% by weight, based on the total weight of the release agent.

11. In the production of molded polyurethane articles, wherein a mold release agent is applied to the walls of the mold prior to the molding, the improvement comprising using as the mold release agent an agent according to claim 1.

* * * * *